June 1, 1954 S. B. McLEOD 2,680,016
POWER UNIT
Filed Dec. 15, 1950 2 Sheets-Sheet 1
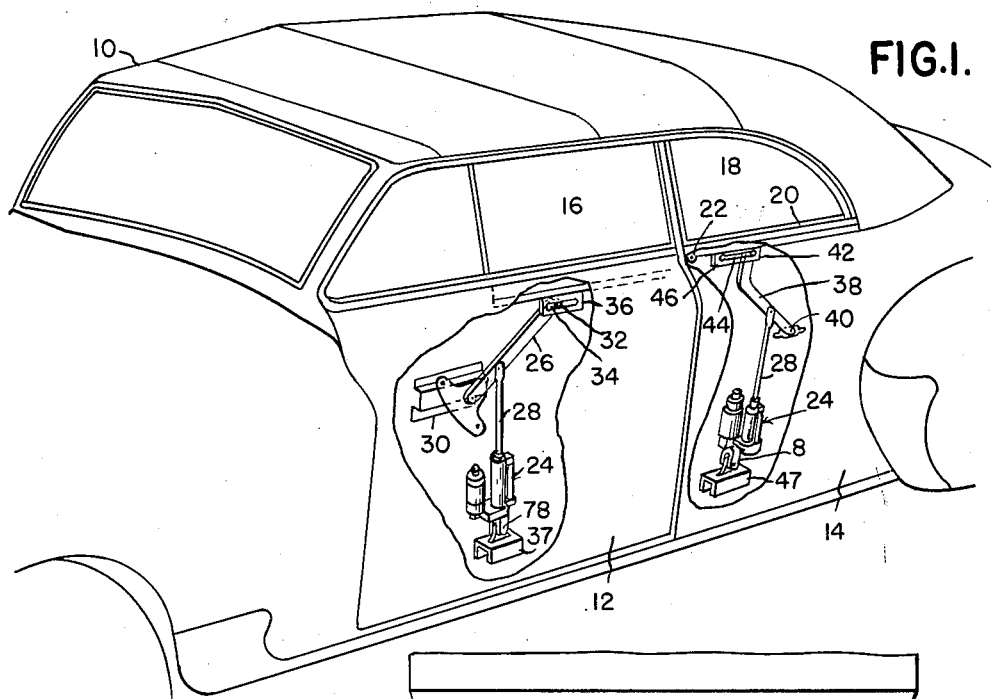
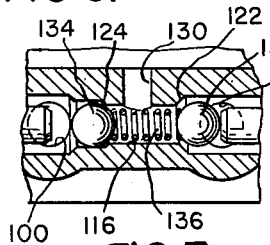
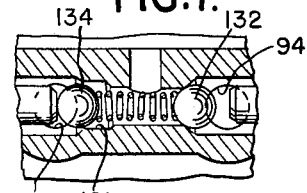
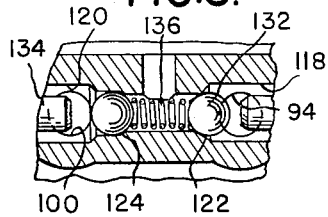
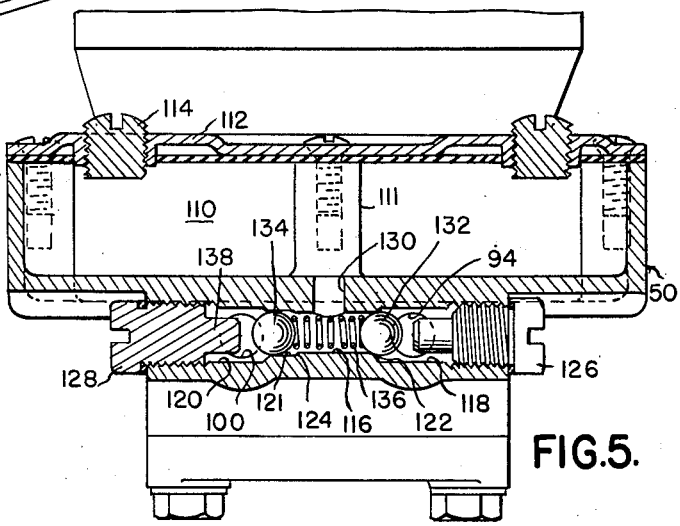
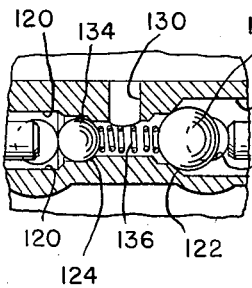
*INVENTOR.*
STEWART B. McLEOD
BY *Whittemore,*
*Hulbert & Belknap*
ATTORNEYS June 1, 1954  S. B. McLEOD  2,680,016
POWER UNIT
Filed Dec. 15, 1950  2 Sheets-Sheet 2

INVENTOR.
STEWART B. McLEOD
BY Whittemore,
Hulbert & Belknap
ATTORNEYS

Patented June 1, 1954

2,680,016

UNITED STATES PATENT OFFICE 2,680,016

POWER UNIT

Stewart B. McLeod, Dearborn, Mich., assignor to Detroit Harvester Company, Detroit, Mich., a corporation of Michigan Application December 15, 1950, Serial No. 200,955

29 Claims. (Cl. 268—125)

The present invention relates to a power unit and more particularly, to a combination electric motor, hydraulic pump, and hydraulic device combined into a compact self-contained unit.

It is an object of the present invention to provide a power unit of the character described, particularly adapted to serve as an actuator for raising and lowering windows in a vehicle.

It is a further object of the present invention to provide a self-contained electric-hydraulic power unit designed to be self-locking in one direction so as to prevent opening of the window by the application of mechanical force when the pump is not operating, while permitting manual reverse movement.

It is a further object of the present invention to provide an electric-hydraulic power unit including a pump, a piston and cylinder device arranged to have differential fluid inflow and outflow during operation, a fluid reservoir adapted to receive excess flow of fluid or to furnish fluid as required in the operation of the device, check valves controlling flow of fluid into said reservoir, a by-pass around the motor, and means effective to close both check valves upon the application of mechanical force to the power device in a direction tending to cause more outflow of fluid than inflow thereof.

Other objects and features of the invention will become apparent as the description proceeds, especially when taken in conjunction with the accompanying drawings, wherein:

Figure 1 is a fragmentary phantom perspective showing the application of the improved power unit to window lifters.

Figure 5 is a section on the line 5—5, Figure 3.

Figures 6, 7, and 8 are fragmentary sectional views showing valve positions under different operating conditions.

Figure 9 is a fragmentary sectional view similar to Figures 6–8, showing a modified valve construction.

Figure 10:
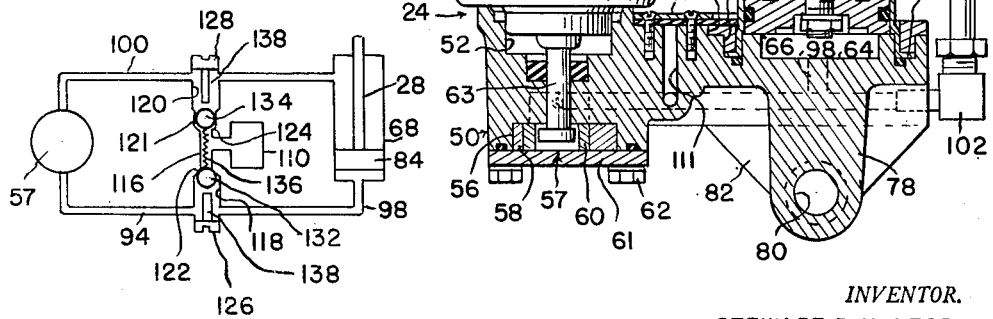

Figure 10 is a flow diagram of the system.

Referring now to the drawings, in Figure 1 there is illustrated a portion of an automobile 10 having a door 12 and a body structure 14. In the door 12 there is provided a window 16 adapted to be raised and lowered vertically. Rearwardly of the vehicle there is a window section 18 including a frame 20 which is pivoted as indicated at 22 for rocking movement to open and close the window section 18.

The window 16 is provided with suitable guide means for controlling its vertical movement and is operatively connected to the power unit indicated generally at 24, by a lever 26 connected to the piston rod 28 of the power unit, the lever 26 being pivoted at one end to a bracket 30 and having a pin 32 at its other end slidable longitudinally in the slot 34 of bracket 36 carried by the window frame. The power unit 24 is pivotally supported by a bracket 37 suitably secured within the door cavity. The rear window section 18 is moved by a similar power unit 24, the piston rod 28 of the power unit being connected to a lever 38 pivoted to the body of the vehicle as indicated at 40 and having a pin 42 at its other end slidable in a slot 44 provided in the bracket 46 carried by the window. In this case the power unit 24 is pivotally supported on a bracket 47 mounted within the frame of the vehicle below the rear window 18.

In power units controlling the movement of windows of this type it is highly desirable to provide automatically operable locking means which prevent the windows being mechanically opened while the power unit is de-energized. At the same time, it is desirable to include means insuring that dangerous forces will not be applied to the windows in the event that an occupant of the vehicle interposes a hand or other part of his body between the window and the door or body frame. These two requirements are taken care of by the present construction as will subsequently be described.

Referring now to Figures 2–5, the power unit 24 comprises a unitary base 50 in the form of a casting. The base 50 is somewhat elongated and at one end is provided with a recessed cylindrical seat 52 for the reception of an electric motor 54. At the opposite side of the base 50 and at the same end as the motor 54, there is provided a cylindrical recess 56 adapted to receive a pump 57 consisting of an internal gear 58 and an external gear 60. In practice, the internal gear is provided with one or more tooth than is provided on the external gear or pinion 60. The pump housing which is formed in part by the cylindrical recess 56 is closed at the lower side by a removable plate 61 secured in place by clamping screws 62. Gear elements 58 and 60 are rotated by the motor and for this purpose the motor shaft 63 extends through an opening provided through the base 50 from the motor seat 52 to the recess 56.

Figure 2:
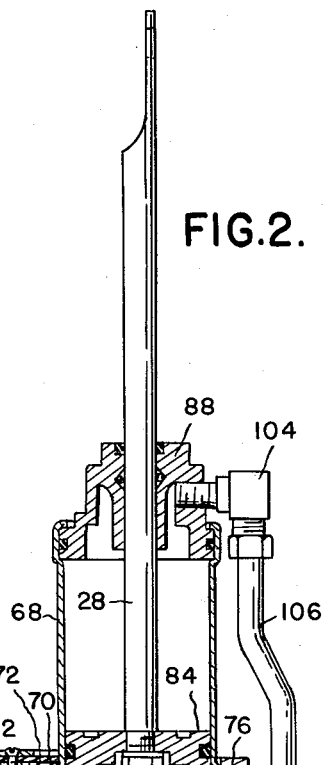
Figure 2 is a side elevation partly in section of the improved power unit.

At the opposite end of the base 50 there is provided a cylinder seat 64 surrounded by an annular seating flange 66. The cylinder seat 64 and flange 66 together serve as a closure for the otherwise open end of the power cylinder 68 and also serve to mount the cylinder in operative position. Outwardly of the annular flange 66 is a cylindrical groove 70 in which is received a ring 72 bolted or otherwise secured in place as by the bolts 74. As indicated in Figure 2, the lower end of the cylinder 68 includes an outwardly extending radial flange 76 engaged beneath the clamping ring 72 and of course, suitable sealing means are provided.

At the same end of the base 50 and at the side thereof opposite to the cylinder 68, there is provided a pivot support 78 having a transverse opening 80 therethrough and strengthened by supporting webs 82. It will be observed that the axis of the opening 80 is perpendicular to and intersects the axis of the cylinder 68, so that the power unit as an assembly will in use rock about an axis intersecting the axis of the cylinder. Located within the cylinder 68 is a piston 84 provided with a piston rod 28 which extends through the cylinder head 88 at the upper end of the cylinder.

Formed within the body of the base 50 and in communication with the bottom of the recess 56 are a pair of ports 90 and 92 in communication with opposite sides of the pump. The pump is designed to be run in opposite direction resulting in a reverse flow of fluid therethrough and for this purpose the motor 54 is also reversible. In communication with the port 90 and within the body of the base 50 is a flow passage 94 which is closed at its outer end by a plug 96. Communicating with the passage 94 is another passage 98 which as best seen in Figure 2, extends through the cylinder seat 64 and thus affords communication between the lower end of the cylinder 68 and the pump port 90. A second longitudinally extending passage 100 is provided within the body of the base 50 connected to port 92 and extends to one end of the base where it receives a fitting 102. The head 88 of the cylinder 68 carries a second fitting 104 and the fittings are interconnected by a metal tube or conduit 106, thus affording communication between the upper end of the cylinder and the valve port 92.

Inasmuch as the power unit operates to raise and lower the windows of a vehicle, it is essential to insure that sufficient force is not exerted on the window to cause injury to an occupant who catches his hand or other part of his body between the window and the frame of the door or vehicle. It is also desirable to permit the motor to run after full stroke of the piston. In the present case this is taken care of by providing a small amount of clearance between one or both of the gear elements 58, 60 and the closure plate 61. Thus, if the motor continues to run when the piston rod 86 is mechanically held against movement, there will be a circulation of fluid within the pump between the ports 90 and 92. This flow is insufficient to seriously decrease the efficiency of the pump in normal operation, but is sufficient to limit the force with which the piston rod 28 is urged upwardly.

Inasmuch as the piston rod 28 occupies the portion of the cylinder 68 above the piston 84, whereas no similar element is present in the portion of the cylinder beneath the piston, it will be apparent that a differential flow of hydraulic fluid to and from the cylinder 68 takes place upon movement of the piston 84. Thus, when the piston 84 is moved upwardly by a flow of hydraulic fluid under pressure into the lower end of the cylinder, more fluid will flow into the lower end of the cylinder than is displaced from the upper end of the cylinder by movement of the piston therein. Conversely, as the piston moves downwardly there is a greater flow of hydraulic fluid out of the lower end of the cylinder than inflow of fluid into the upper end of the cylinder.

Figure 3:
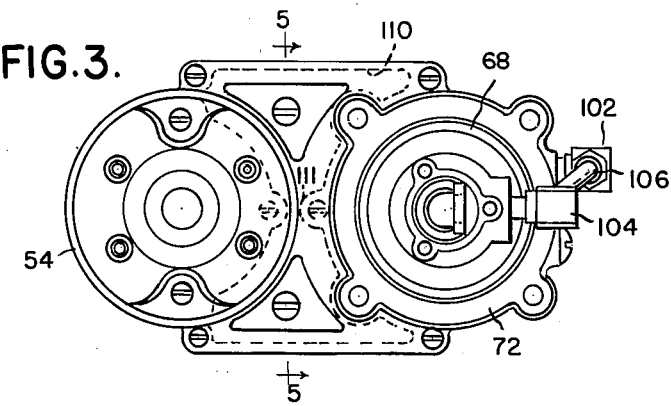
Figure 3 is a top plan view of the power unit shown in Figure 2.
Figure 4:
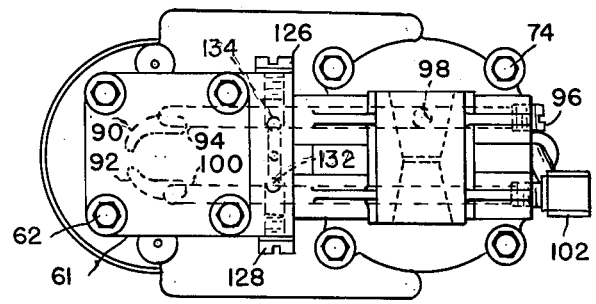
Figure 4 is a bottom plan view of the power unit.

This differential flow requires a reservoir to accommodate the excess flow out of the cylinder upon movement of the piston in one direction and to supply the excess fluid required to move the cylinder in the opposite direction. In the present case the reservoir is provided in the form of a cavity 110 within the base 50. As best seen in Figure 3, where the outline of the cavity 110 appears in dotted lines, it will be observed that the reservoir is of a minimum width on the center line connecting the axis of the motor and the axis of the cylinder. At this point the width of the reservoir is determined by the space between the screw receiving bosses 111 which are also seen in Figure 5. At either side of this center line it is enlarged longitudinally of the base 50. The width of the reservoir on the adjacent center line appears directly in Figure 2 of the drawing. The reservoir 110 is completed by a removable cover plate 112 provided with one or more removable filling plugs 114.

As best seen in Figure 5 the hydraulic fluid flow passages 94 and 100 are interconnected by a transverse passage 116 which serves to connect two enlarged valve chambers 118 and 120. Between the chamber 120 and the passage 116 is a cylindrical portion 121 whose diameter is intermediate that of the passage 116 and the chamber 120. The juncture between the transverse passage 116 and the chamber 118 is formed to provide a valve seat 122. The juncture between the passage 116 and the cylindrical portion 121 is formed to provide a valve seat 124. It will be observed that the flow passages 94 and 100 connect directly with the enlarged chambers 118 and 120 respectively. Outer ends of the chambers 118 and 120 are closed by removable plugs 126 and 128 respectively. A passage 130 connects an intermediate portion of the transverse passage 116 with the interior of the reservoir 110.

Located within the chamber 118 is a ball valve 132. Located within the cylindrical portion 121 and partly within the chamber 120 is a ball valve 134. Intermediate the ball valves is a compression spring 136. The plugs 126 and 128 each include an inwardly extending projection 138 adapted to limit outward movement of the adjacent ball valve. The ball valve 134 is of a size to fit closely within the cylindrical sleeve portion 121 so as to have substantially fluid-tight piston-like movement therein. The spring 136 may be of a free length such that when ball valves 132 and 134 are in engagement with projections 138, the spring cannot contact both ball valves simultaneously. Alternatively, the spring may be of a free length such as to maintain both ball valves against the projections 138 in the absence of fluid pressure. In any case however, when the ball valve 134 is moved by fluid pressure against its seat 124, the spring 136 will be compressed sufficiently to apply a substantial force tending to hold the ball valve 132 in open position.

The arrangement described serves to cooperate with the power device for raising and lowering the window in a novel and valuable manner. Briefly, valves 132 and 134 operate as check valves during operation of the pump 57 in either direction, the valve in the pressure line closing to prevent fluid from being forced into the reservoir and the valve in the suction line being open to permit flow of fluid from the reservoir to the suction line or vice versa depending upon the differential flow to and from the power cylinder 68. However, forces applied to the window in a direction tending to open the window create a fluid block in the system which serves to lock the window in closed position when the pump is not operating. However, the window may be moved from open to closed position manually when the pump is not operating, due to by-pass flow of fluid through the pump, as will subsequently appear.

When the pump 57 is operated in a direction to lower or open the window from its raised or closed position the valves 132 and 134 assume the position illustrated in Figure 6. At this time operation of the pump establishes pressure in the passage 100 thus forcing the valve 134 to enter the cylinder 121 and to move therein in piston-like movement until it seats against valve seat 124. Fluid under pressure from the pump enters the top of the cylinder 68 above the piston 84. This results in downward motion of the piston 84 in the cylinder and displaces a larger quantity of fluid into passage 94 than is flowing into the cylinder through passage 100. At this time valve 134, which is held on its seat under substantial hydraulic pressure, compresses the spring 136 relatively strongly and thus holds the valve 132 off its seat 122. The excess hydraulic fluid displaced from the cylinder as aforesaid, flows past ball valve 132 into passage 116 and thence through passage 130 into the reservoir.

When the pump is operated in a direction to move the window from its lower or open position to its upper or closed position, the valves assume the position indicated in Figure 7. At this time the pump is discharging hydraulic fluid under pressure into the passage 94 and thence through the passage 98 into the bottom of the cylinder 68 beneath its piston 84. The pressure established in the passage 94 immediately closes valve 132 and at this time closing movement of the valve 132 is unopposed since negative pressure exists in the passage 100. This is due to the differential displacement, more fluid flowing into the bottom of the cylinder 68 than is displaced from the top thereof, due to the presence of the piston rod 28 therein. Since more fluid is required to raise the piston in the cylinder than is displaced from the cylinder to the pump, excess fluid is required in the operating system and this fluid flows from the reservoir 110 past ball valve 134. At this time ball valve 134 is moved out of the cylinder portion 121 as seen in Figure 7.

If the window is in its lower or open position and if it is desired to raise the window manually (as may be the case if power fails or the motor is inoperative) the window is manually urged to the upward position thus applying an upward force on the piston 84. This creates pressure in the cylinder above the piston and establishes positive pressure in passage 100, at the same time as a negative pressure is established in the passage 94. Ball valve 134 immediately enters its cylinder portion 121 and may be forced against valve seat 124 if the pressure is sufficient. Fluid under pressure in passage 100 passes through the by-pass provided in the pump 57 and enters passage 94 whence it flows through passage 98 to the bottom of the cylinder 68. This permits a slow upward movement of the window at a rate controlled by the capacity of the by-pass through the pump.

When the window is in upper or closed position and forces are applied directly to the window tending to open the window, a hydraulic block is established which effectively prevents opening movement of the window. Any downward force directly on the window which would be effective to move the window establishes pressure beneath the piston 84. At this time valve 132 closes instantly since its closing movement is not opposed by spring action. The continuation of pressure on the window causes by-pass flow through the pump. Since the hydraulic system is completely filled with fluid at all times, pressure immediately builds up in passage 100 and chamber 120, thus moving valve 134 into its cylinder portion 121. This takes place instantly and requires only a very small pressure in valve chamber 120, since this initial movement of valve 134 is not opposed by spring pressure. If the application of force to the window is continued and increased, pressure in the system builds up and when the pressure reaches a certain value, ball valve 134 will actually seat on valve seat 124. However, flow of fluid past the ball valve is effectively prevented at all times and accordingly, a fluid block is created which prevents downward movement of the window. The conditions existing when a relatively small force is applied tending to open the window is illustrated in Figure 5, which shows ball valve 132 seated and ball valve 134 having entered the cylinder 121. If excessive pressure is applied the only effect is to move ball valve 134 onto its seat as illustrated in Figure 8. Ball valve 132 remains seated, since pressure in chamber 118 is at least as great as in chamber 120.

Referring now to Figure 9 there is illustrated an arrangement which is identical with that previously described except that valve 132a has a larger effective area exposed to pressure within the chamber 118 than is exposed by ball valve 134 in chamber 120. This arrangement insures that with the ball valves in the position illustrated (which corresponds to a fluid block condition in which relatively high pressure has been built up in the fluid system) ball valve 134 will be the first to unseat, thus maintaining ball valve 132a on its seat if pressure is reduced. It will be appreciated that with ball valves of equal size as illustrated in Figure 8, when pressure is reduced to a value sufficient to permit the spring 136 to cause the balls to separate, ball valve 132 may be the first to unseat in which case fluid would flow past the valve into the reservoir. While this condition is theoretically possible it would require very careful manipulation of pressures on the window to effect any appreciable flow of fluid in the reservoir. However, with the construction illustrated in Figure 9 it is impossible to effect opening movement of valve 132a since with equal pressures in chambers 118 and 120, valve 134 will move away from its seat before valve 132a. Movement of valve 134 away from its seat and along the cylinder 121 does not open the passages to flow but reduces pressure on the spring 136, thus permitting valve 132a to remain on its seat under correspondingly reduced pressures within the chamber 118.

Spring 136 may be of such length that when ball valve 132a is on its seat, valve 134 moves out of contact with the spring 136 before it emerges from the cylinder 121. If this arrangement is employed it will be apparent that forces of any magnitude applied tending to open the window will immediately close the fluid passages controlled by valves 132a and 134 and this closure of these passages is maintained even though the pressure is built up to a very large value and thereafter reduced to a very small value.

The drawings and the foregoing specification constitute a description of the improved power unit in such full, clear, concise and exact terms as to enable any person skilled in the art to practice the invention, the scope of which is indicated by the appended claims.

What I claim as my invention is:

1. A construction comprising a fluid passage, first and second outwardly facing valve seats at opposite ends of said passage, first and second valves movable respectively toward and away from said first and second seats, a cylinder extending outwardly from said first seat in which said first valve is slidably received in fluid-sealing relation for piston-like movement in said cylinder, an enlarged chamber beyond the end of said cylinder remote from said first seat, said first valve being movable into said chamber to permit fluid flow past said first valve and through said first valve seat, and a compression spring in said passage engaging both of said valves when both of said valves are on their respective seats.

2. A construction as defined in claim 1 in which said spring is of such length that it does not engage both valves when said first valve is in said chamber.

3. A construction as defined in claim 1 in which said second valve is of larger effective area than said first valve.

4. A construction as defined in claim 3 in which said spring is of such length that it does not engage both valves when said first valve is in said chamber.

5. A construction as defined in claim 1 in which said valves are balls.

6. A construction as defined in claim 1 comprising in addition a fluid reservoir, and a supply passage connecting said reservoir to said first mentioned passage intermediate its ends.

7. In a hydraulic system comprising a pair of flow passages subjected alternately to pressure and suction, in normal operation, and which may be both subjected to pressure, a reservoir, first and second supply passages connecting said reservoir respectively to said flow passages, first and second check valves respectively in said first and second supply passages, said first valve comprising a first valve element, a cylinder in which said first valve element is movable, said cylinder being dimensioned to fit said first valve element in sealing relation, a valve seat at one end of said cylinder, and an enlarged chamber at the other end of said cylinder into which said first valve element is movable to provide for flow of fluid past said first valve element and means operatively connecting said valves effective to establish a strong force holding said second valve open when said first valve element is seated, and effective to permit movement of the first valve element under low pressure in its flow line to a position in said cylinder preventing flow past said first valve element when the said second valve is closed.

8. Structure as defined in claim 7 in which said second valve comprises a second valve element and said means is interposed directly between said valve elements.

9. Structure as defined in claim 8 in which said means is a compression spring.

10. A power regulator for opening and closing a movable closure, comprising a cylinder, a piston movable in said cylinder, a piston rod extending from one side of said piston, means for connecting said cylinder and piston rod to a closure in such relation that opening movement of the closure causes relative movement of said piston in said cylinder in a direction away from said piston rod, a reversible pump, a first flow passage connecting one side of said pump to the end of said cylinder containing said piston rod, a second flow passage connecting the other side of said pump to the end of said cylinder remote from said piston rod, a restricted by-pass between opposite sides of said pump, a reservoir for containing fluid to compensate for differential flow to and from said cylinder, a first supply passage connecting said reservoir and said first flow passage, a second supply passage connecting said reservoir and said second flow passage, a first check valve in said first supply passage, a second check valve in said second supply passage, said check valves comprising valve elements freely movable to open position when negative pressure is developed in the adjacent flow line, and spring means interposed directly between said valve elements operable by movement of said first check valve element to closed position in response to high pressure in said first flow passage to hold said second check valve element in open position against any pressure in said second passage lower than the pressure in said first passage, said spring means permitting movement of said first check valve element to position to prevent flow of fluid therepast under any positive pressure in said first passage when said second check valve element is closed by any positive pressure in said second passage.

11. Structure as defined in claim 10 in which said first valve includes a cylinder in which its valve element is slidable therein in fluid-sealing relation for piston-like movement, and said spring means is engageable with both of said valve elements.

12. Structure as defined in claim 11 in which said second valve element has a larger effective area than said first valve element.

13. Structure as defined in claim 10 in which said closure is a window of a motor vehicle.

14. In a motor vehicle, a movable window, a piston and cylinder power device for raising and lowering said window, said power device including a piston rod at one side only of said piston, movement of said window toward open position being accompanied by movement of said piston in said cylinder in a direction away from said piston rod, fluid flow passages connected to opposite ends of said cylinder, a restricted by-pass connecting said flow passages, a reservoir, supply passages connecting said reservoir to said flow passages, check valves in said supply passages including movable valve elements and means operably connecting said valve elements to provide for power movement of the window in either direction by the application of fluid under pressure to one or the other of said flow passages, to provide for manual closing of the window, and to establish a fluid block preventing manual opening of the window by the application of a force of any value directly to the window.

15. A hydraulic system comprising a reversible pump, a cylinder, a piston in said cylinder, a piston rod connected to said piston at one side thereof, a first flow passage connecting one side of said pump to the end of said cylinder containing said piston rod, a second flow passage connecting the other side of said pump to the other end of said cylinder, a restricted by-pass connecting opposite sides of said pump, a fluid reservoir to compensate for differential flow to and from said cylinder, first and second supply passages connecting said reservoir respectively to said first and second flow passages, first and second check valves and seats respectively in said first and second supply passages, said check valves being adapted to be closed by pressure in the respective flow passages, said first check valve seat having a valve cylinder extending outwardly from the valve seat, an enlarged chamber into which said valve cylinder opens, said first check valve being slidable in fluid-sealing relation in said valve cylinder and movable between a position on said valve seat and a position at least partly in said chamber to provide for flow of fluid past said first check valve, and a compression spring interposed between said first and second check valves.

16. A system as defined in claim 15 in which said spring is of such length that when said first check valve is in position at least partly in said chamber said spring exerts substantially no opening force on said second check valve.

17. A system as defined in claim 15 in which said second check valve has a larger effective area exposed to pressure within the adjacent flow passage than does said first check valve.

18. In combination with a closure member movable between closed and open positions, a hydraulic motor of the type having a differential inlet and outlet fluid flow, means connecting said motor to said closure member for direct power actuation of said closure in both opening and closing directions, a pump, fluid flow passages connecting opposite sides of said pump to opposite sides of said motor, means for reversing the direction of flow in said flow passages to reverse said motor, said motor being connected to said closure in such a way that inlet flow to said motor through a first one of said flow passages is less than outlet flow from said motor through the second one of said flow passages when said closure is being moved toward open position, a restricted bypass connecting said flow passages, a fluid reservoir, first and second supply passages connecting said first and second flow passages to said reservoir, first and second check valves each comprising a valve seat and valve member respectively located in said first and second supply passages, each of said check valves being adapted to close when pump pressure is directed into its corresponding flow passage, first means responsive to establishment of pump pressure in said first flow passage effective to establish a yieldable force tending to hold said second valve member open to permit excess fluid flowing from the outlet from said motor returning to said reservoir as said closure is moved toward open position, said first valve member being freely movable to open position when pump pressure is directed into said second flow passage to permit fluid to flow from said reservoir to said first flow passage, and second means associated with said first valve member to provide for closing of said first valve member despite prior closure of said second valve member under minimum bypass flow conditions existing in said first flow passage when force is applied directly to said closure in opening direction while said pump is idle.

19. Structure as defined in claim 18 in which said valve seats are aligned and face outwardly from each other, and said first means comprises a compression spring interposed between said valve members.

20. Structure as defined in claim 19 in which said second means comprises a cylinder surrounding the seat of said first valve in which its valve member is slidable in sealing relation, an enlarged chamber spaced from said first valve seat and communicating with said first flow passage into which said cylinder opens and into which said first valve member is at least partly movable to provide for flow of fluid from said reservoir to said first flow passage.

21. Structure as defined in claim 20, said spring being of such length that when said second valve member is seated, said first valve member does not engage said spring until it is in fluid sealing relation within said cylinder.

22. Structure as defined in claim 21, said second valve member having a larger effective area exposed to the pressure of its associated flow passage than does said first valve member.

23. In apparatus of the character described, first and second valve seats, said first seat having a cylinder extending therefrom, a first valve member fitting closely within said cylinder and slidable therein in sealing relation between a position on said first seat and a second position at least partly beyond the outer end of said cylinder to permit flow of fluid through said first valve seat and past said first valve member, a second valve member associated with said second valve seat, means surrounding said second valve member and defining therewith a passage for the flow of fluid through said second valve seat and past said second valve member whenever said second valve member is spaced from said second valve seat, and resilient means cooperable with said valve members effective to establish a resilient force urging said second valve member away from its seat when said first valve member is on its seat, and effective to urge said first valve member to but not beyond an intermediate sealing position in said cylinder when said second valve member is on its seat.

24. Structure as defined in claim 23 in which said valve seats are axially aligned in opposed relation, and said resilient means comprises a compression spring intermediate said valve members of a length to be partly compressed when both of said valve members are on their seats and fully extended when said second valve member is on its seat and said first valve member is in intermediate sealing position in its cylinder.

25. In a motor vehicle, a movable window, a piston and cylinder power device for raising and lowering said window, said power device including a piston rod at one side only of said piston, movement of said window toward open position being accompanied by movement of said piston in said cylinder in a direction away from said piston rod, fluid flow passages connected to opposite ends of said cylinder, a restricted bypass connecting said flow passages, a reservoir, supply passages connecting said reservoir to said flow passages, check valves in said supply passages, each of said check valves being adapted to close when connected to the flow passage carrying fluid under pressure to move said window in either direction, means operatively associated with both of said check valves for holding the proper one of said valves open to permit return of excess fluid to said reservoir under power movement of said window toward open position, and means operatively associated with the other of said valves to prevent flow of fluid past said other valve under bypass flow conditions when manual pressure is applied directly to said window in a direction to open it, thereby creating a fluid block which prevents manual opening of the window.

26. In a motor vehicle, a movable window, a closed hydraulic system for actuating said window comprising a differential flow motor connected directly to said window for positive power actuation thereof in both directions, said motor arranged to require an excess of outlet flow over inlet flow when operating in a direction to open said window, a reservoir connected to said system to supply excess fluid to said system when said motor is operated in a direction to close said window and to receive excess fluid from said system when said motor is operated in a direction to open said window, check valves controlling flow of fluid from said system to said reservoir, means operatively associated with said check valves effective to prevent return of fluid from said system to said reservoir when manual pressure is applied directly to said window tending to open said window, and means operatively associated with said check valves effective to provide for flow of fluid from said system to said reservoir when said motor is supplied with fluid under pressure in a direction to open said window, whereby said window may be actuated in either direction by said motor, but a hydraulic block prevents opening of said window when said motor is not supplied with fluid under pressure.

27. In a fluid system, a pair of opposed valve seats, a cylinder extending outwardly from one valve seat, a laterally enlarged chamber at the outer end of said cylinder, a valve member movable toward and away from each of said seats, one of said valve members being movable in fluid-sealing relation in said cylinder, and a compression spring interposed between said valve members, whereby said one valve member is movable in said cylinder to prevent flow of fluid therepast while exerting a variable valve lifting force on said other valve member.

28. In a fluid system, a pair of opposed valve seats, a cylinder extending outwardly from one valve seat, a laterally enlarged chamber at the outer end of said cylinder, a valve member movable toward and away from each of said seats, one of said valve members being movable in fluid-sealing relation in said cylinder, and means interposed directly between said valve members of a length such that closure of said other valve member permits entry of said one valve member into said cylinder in sealing relation therewith under minimum pressure conditions acting to move said one valve toward its seat, and such that movement of said one valve member towards its seat under a higher pressure condition establishes forces tending to unseat said other valve member.

29. Structure as defined in claim 28 in which said other valve member has a larger effective cross-sectional area exposed to fluid in the system than said one valve member, whereby said other valve member is retained on its seat until the pressure acting on said one valve member exceeds the pressure acting on said other valve member.

References Cited in the file of this patent

UNITED STATES PATENTS

| Number | Name | Date |
|---|---|---|
| 776,061 | Hewitt | Nov. 29, 1904 |
| 1,307,839 | Williams | June 24, 1919 |
| 1,409,116 | Sammis | Mar. 7, 1922 |
| 1,812,587 | Ellis | June 30, 1931 |
| 1,931,637 | Wahl | Oct. 24, 1933 |
| 1,999,693 | Hill | Apr. 30, 1935 |
| 2,122,045 | Rose et al. | June 28, 1938 |
| 2,282,977 | Mast | May 12, 1942 |
| 2,301,576 | Parsons et al. | Nov. 10, 1942 |
| 2,388,755 | McLeod | Nov. 13, 1945 |
| 2,412,428 | Rockwell | Dec. 10, 1946 |
| 2,437,115 | Muller et al. | Mar. 2, 1948 |
| 2,475,304 | Bariffi | July 5, 1949 |

FOREIGN PATENTS

| Number | Country | Date |
|---|---|---|
| 781 | Great Britain | 1898 |
| 344,897 | Italy | Nov. 30, 1936 |